United States Patent [19]

Kuribayashi et al.

[11] Patent Number: 4,685,948
[45] Date of Patent: Aug. 11, 1987

[54] MOLD FOR PRESS-MOLDING GLASS OPTICAL ELEMENTS AND A MOLDING METHOD USING THE SAME

[75] Inventors: Kiyoshi Kuribayashi, Hirakata; Masayuki Sakai, Osaka; Hideto Monji, Katano; Masaki Aoki, Mino; Hideyuki Okinaka, Toyonaka; Hideo Torii, Higashiosaka, all of Japan

[73] Assignee: Matsushita Electric Industrial Co., Ltd., Osaka, Japan

[21] Appl. No.: 824,961

[22] Filed: Jan. 31, 1986

[30] Foreign Application Priority Data

Feb. 8, 1985 [JP] Japan .................. 60-23837
Apr. 19, 1985 [JP] Japan .................. 60-84902
Jul. 15, 1985 [JP] Japan .................. 60-155405
Oct. 22, 1985 [JP] Japan .................. 60-236061

[51] Int. Cl.$^4$ ........................... C03B 40/00
[52] U.S. Cl. ................... 65/26; 65/374.11; 65/374.12; 65/36; 249/116
[58] Field of Search .............. 65/374.11, 374.12, 26, 65/37, 112; 249/116, 114 R; 425/77, DIG. 26

[56] References Cited

U.S. PATENT DOCUMENTS 1,466,640 8/1923 Coleman .................. 249/116 X
3,233,993 2/1966 Weidel .................. 65/374.11
3,657,784 4/1972 Selman et al. ............. 65/374.12 X
3,736,109 5/1973 Darling et al. ............ 65/374.11 X

FOREIGN PATENT DOCUMENTS 553 of 1857 United Kingdom ............ 65/374.12

Primary Examiner—Robert L. Lindsay
Attorney, Agent, or Firm—Wenderoth, Lind & Ponack

[57] ABSTRACT

A glass optical element is directly press-molded by a method using a noble mold. The mold comprises a base material and a press surface film formed on the base material. The press surface film is an Ir film, or a Ru film, or an alloy film comprising Ir and at least a member selected from the group consisting of Pt, Re, Os, Rh and Ru, or an alloy film comprising Ru and at least a member selected from the group consisting of Pt, Re, Os and Rh.

15 Claims, 3 Drawing Figures

MOLD FOR PRESS-MOLDING GLASS OPTICAL ELEMENTS AND A MOLDING METHOD USING THE SAME

BACKGROUND OF THE INVENTION

1. Field of the Invention

The present invention relates to a mold for press-molding glass optical elements and a molding method using the mold, and more particularly to a mold for press-molding glass optical elements with high accuracy without the need of any further process such as a polishing process after the molding, and a molding method using the same.

2. Description of the Prior Art

Recently, a desire has arisen for cameras for video tape recorders and compact disc players which are small-sized, lightweight and low in cost, and therefore simplification of the lens system has been required. Since the conventional spherical lens is limited in simplification, an aspherical lens is required. However, the manufacturing of the aspherical lens by use of the conventional polishing method has a problem in mass-productivity.

For this reason, a tendency to manufacture the aspheric lens by a direct press-molding has recently been promoted.

One technical factor important in molding an aspheric lens with high accuracy by direct pressing is the material used for the mold. Namely, it is important in the mold for directly press-molding the glass lens with high accuracy that (1) the material of the mold surface does not react on the glass at a high temperature (or the glass does not adhere to the mold surface), (2) the press surface of the mold is hard enough not to be damaged by a scratch or the like, (3) the mold is not deformed at a high temperature, (4) the mold is strong enough even at a high temperature, and (5) the mold is superior in resistance to heat shock.

The mold for directly press-molding glass optical elements has until today been reported to use silicon carbide (SiC), silicon nitride ($Si_3N_4$), titanium nitride (TiN), titanium carbide (TiC), vitreous carbon, tungsten carbide (WC), or nickel group alloy.

However, since SiC, $Si_3N_4$, and TiC are each of an extremely high hardness, it is very difficult to form these materials each into an aspherical shape with high accuracy. Moreover, these materials and WC are all to be sintered, and thus a third component is added as a sintering agent. Since the third component is easy to react on the glass, it makes it impossible to mold the glass optical element with high accuracy. Also, the press-molding using the aforesaid materials, vitreous carbon and titanium nitride, is defective in that the press surface of the mold is oxidized and thus deteriorates unless the concentration of $O_2$ is controlled to be low. For the nickel group alloy, the grain growth is generated under pressing at about 500° C., so that the press surface of the mold becomes rough. Futhermore, the glass, especially lead oxide series glass, is apt to be attached to the nickel group alloy. Hence, the nickel group alloy is not suitable for molding the glass optical element with high accuracy.

SUMMARY OF THE INVENTION

An object of the invention is to provide a method of manufacturing at low cost glass optical elements with high surface quality and high surface accuracy.

Another object of the invention is to provide a mold for press-molding glass optical elements with high surface quality and high surface accuracy.

In order to attain the above objects, the present invention uses a pair of molds each comprising: a base material made of (1) a sintered hard alloy mainly comprising tungsten carbide (WC), (2) cermet mainly comprising TiC, TiN, $Cr_3C_2$ or $Alhd 2O_3$, or (3) silicon, which have heat-resistance, superior workability and adhesive property; and press surface film formed on the base material and comprising (1) iridium (Ir), (2) ruthenium (Ru), (3) an alloy comprising iridium (Ir) and at least one member selected from the group consisting of platinum (Pt), rhenium (Re), rhodium (Rh), osmium (Os) and ruthenium (Ru), or (4) an alloy comprising ruthenium (Ru) and at least one member selected from the group consisting of platinum (Pt), rhenium (Re), rhodium (Rh) and osmium (Os). A mass of glass is heated to be at least its softening temperature, and thereafter the softened mass of glass is subjected to a pressure to be molded to an optical element of good image-formation quality and of high accuracy.

The above and other objects, features and advantages of the invention will be apparent from the following description, taken in connection with the preferred embodiments and the accompanying drawings.

DESCRIPTION OF THE PREFERRED EMBODIMENTS (Example 1)

An embodiment of a mold for press-molding glass optical elements of the invention will be described with reference to FIGS. 1 and 2 and Table 1.

Figure 1:
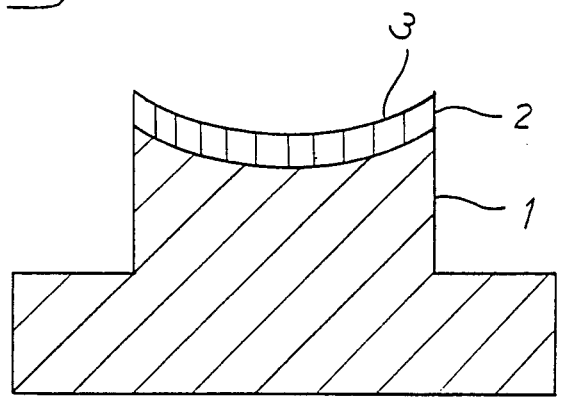
FIGS. 1 and 3 are sectional views of embodiments of molds according to the invention.
Figure 2:
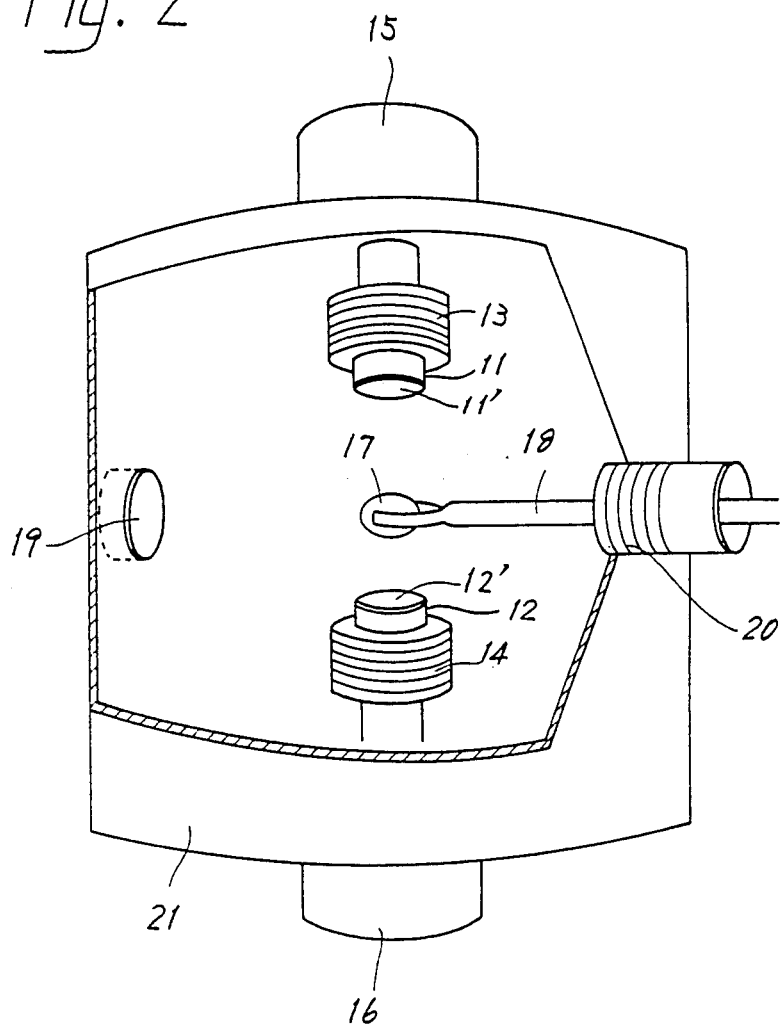
FIG. 2 is a partially cutaway perspective view of a molding apparatus used in the invention.

FIG. 1 is a sectional view of an embodiment of a mold used for press-molding glass optical elements of the invention. This mold comprises a base material 1 of a sintered hard alloy mainly comprising tungsten carbide (WC), machined to a desired shape by a cutting method using a diamond cutting tool, and a press surface film 2 which is an iridium (Ir) film or an iridium series alloy film is formed about 5 μm in thickness on the WC base material 1 by a sputtering method. Thus, a press surface (or mold surface) 3 is formed. FIG. 2 is a partially cutaway perspective view of a molding apparatus installing therein a pair of molds manufactured as the above-mentioned.

A mass 17 of lead oxide series glass composed of 57 wt % of lead oxide (PbO), 37 wt % of silicon oxide ($SiO_2$) and a trace of other components was preheated at a temperature of 530° C. for two minutes in a glass mass preheating furnace 20, and thereafter transported between the upper and lower molds 11 and 12 which were preheated at a temperature of 530° C. by heaters 13 and 14, respectively. Then, the mass of glass 17 put on the lower mold 12 was, press-molded under a pressure of 40 kg/cm² and cooled as is down to 400° C.

together with the upper and lower molds 11 and 12. An upper mold piston cylinder 15 was reduced in pressure to zero so that the upper mold 11 was raised. Then, the molded glass optical element was taken out from an outlet 19, thus completing the press-molding of the glass optical element. The atmosphere in a chamber 21 was a mixed gas of $N_2$ gas and $O_2$ gas with $O_2$ concentration of 0.01 to 1.0%. A lower mold piston cylinder 16 was for moving the lower mold 12. A supply arm 18 was for holding the glass mass 17.

The aforesaid press-molding was repeated 500 times, and thereafter the press surfaces 11' and 12' of the upper and lower molds 11 and 12 was measured for roughness and accuracy at the press surfaces. Also, the optical performance of each of the molded glass optical elements obtained at 500th molding was measured to determine the quality of the mold.

The aforesaid press-molding experiments were carried out as to molds having as the press surface film on the WC base material an iridium (Ir) film and an alloy film comprising iridium (Ir) and at least one member selected from the group consisting of platinum (Pt), rhenium (Re), rhodium (Rh), osmium (Os) and ruthenium (Ru). The results of the experiments are shown in Table 1.

TABLE 1

Experimental Results of Molding Lead Oxide Series Glass (Part 1)

| Specimen No. | Composition of press surface film (wt %) | | | | | | Evaluation of mold after 500 times molding | | Optical performance of element obtained at 500th molding |
|---|---|---|---|---|---|---|---|---|---|
| | Ir | Pt | Re | Rh | Os | Ru | Surface roughness (PV Value, Å) | Surface accuracy (RMS Value, xλ) | |
| 1 | 100 | 0 | 0 | 0 | 0 | 0 | o (130) | o (0.026) | o |
| 2 | 90 | 10 | 0 | 0 | 0 | 0 | o (126) | o (0.023) | o |
| 3 | 71 | 29 | 0 | 0 | 0 | 0 | o (122) | o (0.028) | o |
| 4 | 90 | 0 | 10 | 0 | 0 | 0 | o (130) | o (0.021) | o |
| 5 | 70 | 0 | 30 | 0 | 0 | 0 | o (110) | o (0.029) | o |
| 6 | 50 | 0 | 50 | 0 | 0 | 0 | o (120) | o (0.024) | o |
| 7* | 45 | 0 | 55 | 0 | 0 | 0 | x (880) | x (0.086) | x |
| 8 | 90 | 0 | 0 | 10 | 0 | 0 | o (122) | o (0.024) | o |
| 9 | 70 | 0 | 0 | 30 | 0 | 0 | o (128) | o (0.022) | o |
| 10 | 55 | 0 | 0 | 45 | 0 | 0 | o (130) | o (0.030) | o |
| 11 | 45 | 0 | 0 | 55 | 0 | 0 | o (121) | o (0.026) | o |
| 12* | 40 | 0 | 0 | 60 | 0 | 0 | x (960) | x (0.092) | x |
| 13 | 90 | 0 | 0 | 0 | 10 | 0 | o (120) | o (0.021) | o |
| 14 | 70 | 0 | 0 | 0 | 30 | 0 | o (126) | o (0.028) | o |
| 15 | 50 | 0 | 0 | 0 | 50 | 0 | o (128) | o (0.024) | o |
| 16* | 45 | 0 | 0 | 0 | 55 | 0 | x (990) | x (0.090) | x |
| 17 | 90 | 0 | 0 | 0 | 0 | 10 | o (126) | o (0.020) | o |
| 18 | 70 | 0 | 0 | 0 | 0 | 30 | o (125) | o (0.028) | o |
| 19 | 50 | 0 | 0 | 0 | 0 | 50 | o (120) | o (0.029) | o |
| 20 | 30 | 0 | 0 | 0 | 0 | 70 | o (118) | o (0.025) | o |
| 21 | 10 | 0 | 0 | 0 | 0 | 90 | o (124) | o (0.030) | o |
| 22 | 0 | 0 | 0 | 0 | 0 | 100 | o (120) | o (0.024) | o |
| 23 | 80 | 10 | 10 | 0 | 0 | 0 | o (123) | o (0.021) | o |
| 24 | 80 | 0 | 10 | 10 | 0 | 0 | o (120) | o (0.026) | o |
| 25 | 80 | 0 | 0 | 10 | 10 | 0 | o (128) | o (0.020) | o |
| 26 | 80 | 0 | 0 | 0 | 10 | 10 | o (120) | o (0.025) | o |
| 27 | 80 | 10 | 0 | 10 | 0 | 0 | o (118) | o (0.030) | o |
| 28 | 80 | 0 | 10 | 0 | 0 | 10 | o (130) | o (0.030) | o |
| 29 | 80 | 10 | 0 | 0 | 10 | 0 | o (121) | o (0.021) | o |
| 30 | 80 | 0 | 10 | 0 | 10 | 0 | o (125) | o (0.027) | o |
| 31 | 60 | 20 | 10 | 10 | 0 | 0 | o (124) | o (0.021) | o |
| 32 | 60 | 0 | 20 | 0 | 10 | 10 | o (125) | o (0.026) | o |
| 33 | 60 | 0 | 0 | 20 | 10 | 10 | o (121) | o (0.021) | o |
| 34 | 60 | 10 | 0 | 0 | 20 | 10 | o (119) | o (0.028) | o |
| 35 | 60 | 0 | 10 | 10 | 0 | 20 | o (128) | o (0.019) | o |
| 36 | 40 | 10 | 10 | 10 | 10 | 20 | o (130) | o (0.029) | o |
| 37 | 40 | 10 | 20 | 10 | 10 | 10 | o (125) | o (0.021) | o |
| 38 | 40 | 10 | 10 | 10 | 20 | 10 | o (121) | o (0.022) | o |
| 39 | 20 | 20 | 25 | 10 | 25 | 0 | o (122) | o (0.027) | o |
| 40 | 20 | 10 | 20 | 0 | 25 | 25 | o (125) | o (0.026) | o |
| 41 | 20 | 0 | 10 | 25 | 0 | 25 | o (125) | o (0.027) | o |
| 42 | 20 | 25 | 0 | 25 | 10 | 20 | o (124) | o (0.023) | o |
| 43* | 15 | 20 | 10 | 30 | 25 | 0 | x (860) | x (0.090) | x |
| 44* | 15 | 10 | 25 | 20 | 30 | 0 | x (920) | x (0.088) | x |
| 45* | 30 | 10 | 55 | 0 | 5 | 0 | x (840) | x (0.082) | x |
| 46* | 30 | 0 | 0 | 5 | 55 | 10 | x (890) | x (0.091) | x |
| 47* | 30 | 0 | 10 | 60 | 0 | 5 | x (930) | x (0.090) | x |
| 47 | 15 | 20 | 25 | 0 | 30 | 10 | o (122) | o (0.022) | o |
| 48 | 15 | 10 | 0 | 30 | 35 | 10 | o (125) | o (0.029) | o |
| 49 | 10 | 0 | 30 | 20 | 25 | 15 | o (129) | o (0.024) | o |
| 50 | 10 | 20 | 20 | 0 | 35 | 15 | o (127) | o (0.029) | o |
| 51* | 10 | 20 | 20 | 20 | 20 | 10 | x (900) | x (0.080) | x |
| 52* | 10 | 0 | 40 | 0 | 40 | 10 | x (850) | x (0.081) | x |
| 53* | 10 | 0 | 0 | 40 | 40 | 10 | x (840) | x (0.092) | x |

① *: Represents each comparison example.
② o: Represents no variation in surface roughness and in surface accuracy, and a proper optical performance.
③ x: Represents a rough surface, deterioration in surface accuracy, and poor optical performance.

As seen from Table 1, the mold with the Ir film could press-mold a good glass optical element without roughening or deteriorating the press surface. An Ir-Pt binary alloy film of Ir content of 71 wt % or more (Pt content of 29 wt % or less) showed satisfactory results. An Ir-Re binary alloy film and an Ir-Os binary alloy film each of Ir content of 50 wt % or more (Re or Os content of 50 wt % or less) showed satisfactory results, and an Ir-Rh binary alloy film of Ir content of 45 wt % or more (Rh content of 55 wt % or less) did so. An Ir-Ru binary alloy film showed satisfactory result throughout the entire composition range. An alloy film composed of 20 or more wt % of Ir and at least two kinds of metals selected from the group consisting of Pt, Re, Rh, Os and Ru, showed satisfactory results under conditions of Pt content being 29 wt % or less, Re content being 50 wt % or less, Rh content being less than 55 wt %, or Os content being 50 wt % or less. On the other hand, in case where the alloy film had the Ir content of less than 20 wt % and no Ru, the press surface was roughened and the surface accuracy was deteriorated. However, in the case where the mold with the alloy film containing Ir of the content even of less than 20 wt % and Ru so that the total content of Ir and Ru was 25 wt % or more, the press surface was not roughened and the surface accuracy was not deteriorated, thereby enabling a glass optical element of high accuracy to be formed.

In addition, the press mold of a concave surface (for lens) as shown in FIG. 1 is used for the convenience of explanation of the invention, the form of the press surface (mold surface) of mold of the invention is not limited to this embodiment, but may of course be applicable to any form of glass optical element, such as a prism.

(Example 2)

This example used a mold with a press surface film formed on the WC base material, which film is an Ru film or an alloy film comprising Ru and at least one member selected from the group consisting of Pt, Re, Rh and Os. The mold was subjected to the same experiment as described in Example 1, and the results of the experiment are shown in Table 2.

TABLE 2

Experimental Results of Molding Lead Oxide Series Glass (Part 1)

| Specimen No. | Composition of press surface film (wt %) | | | | | Evaluation of mold after 500 times molding | | Optical performance of element obtained at 500th molding |
|---|---|---|---|---|---|---|---|---|
| | Ru | Pt | Re | Rh | Os | Surface roughness (PV Value, Å) | Surface accuracy (RMS Value, xλ) | |
| 22 | 100 | 0 | 0 | 0 | 0 | o (120) | o (0.024) | o |
| 54 | 90 | 10 | 0 | 0 | 0 | o (122) | o (0.028) | o |
| 55 | 71 | 29 | 0 | 0 | 0 | o (126) | o (0.030) | o |
| 56 | 90 | 0 | 10 | 0 | 0 | o (130) | o (0.026) | o |
| 57 | 70 | 0 | 30 | 0 | 0 | o (120) | o (0.021) | o |
| 58 | 50 | 0 | 50 | 0 | 0 | o (125) | o (0.022) | o |
| 59* | 45 | 0 | 55 | 0 | 0 | x (870) | x (0.092) | x |
| 60 | 90 | 0 | 0 | 10 | 0 | o (123) | o (0.027) | o |
| 61 | 70 | 0 | 0 | 30 | 0 | o (124) | o (0.026) | o |
| 62 | 45 | 0 | 0 | 55 | 0 | o (123) | o (0.030) | o |
| 63* | 40 | 0 | 60 | 0 | | x (920) | x (0.091) | x |
| 64 | 90 | 0 | 0 | 0 | 10 | o (120) | o (0.027) | o |
| 65 | 70 | 0 | 0 | 0 | 30 | o (131) | o (0.025) | o |
| 66 | 50 | 0 | 0 | 0 | 50 | o (125) | o (0.025) | o |
| 67* | 45 | 0 | 0 | 0 | 55 | x (860) | x (0.085) | x |
| 68 | 80 | 10 | 10 | 0 | 0 | o (121) | o (0.021) | o |
| 69 | 80 | 0 | 10 | 10 | 0 | o (123) | o (0.025) | o |
| 70 | 80 | 0 | 0 | 10 | 10 | o (126) | o (0.025) | o |
| 71 | 80 | 10 | 0 | 0 | 10 | o (131) | o (0.024) | o |
| 72 | 80 | 0 | 10 | 0 | 10 | o (120) | o (0.028) | o |
| 73 | 60 | 20 | 0 | 20 | 0 | o (130) | o (0.030) | o |
| 74 | 60 | 0 | 20 | 20 | 0 | o (126) | o (0.021) | o |
| 75 | 60 | 0 | 20 | 0 | 20 | o (124) | o (0.024) | o |
| 76 | 40 | 10 | 10 | 20 | 20 | o (126) | o (0.024) | o |
| 77 | 40 | 20 | 20 | 10 | 10 | o (121) | o (0.023) | o |
| 78 | 40 | 20 | 40 | 0 | 0 | o (120) | o (0.028) | o |
| 79 | 40 | 0 | 10 | 10 | 40 | o (129) | o (0.027) | o |
| 80 | 40 | 10 | 0 | 40 | 10 | o (127) | o (0.026) | o |
| 81 | 20 | 20 | 20 | 20 | 20 | o (125) | o (0.023) | o |
| 82 | 20 | 0 | 30 | 30 | 20 | o (123) | o (0.021) | o |
| 83 | 20 | 20 | 0 | 30 | 30 | o (130) | o (0.029) | o |
| 84* | 15 | 20 | 30 | 0 | 35 | x (870) | x (0.089) | x |
| 85* | 15 | 20 | 0 | 35 | 30 | x (850) | x (0.093) | x |
| 86* | 15 | 0 | 35 | 20 | 30 | x (900) | x (0.085) | x |
| 87* | 30 | 0 | 55 | 15 | 0 | x (920) | x (0.084) | x |
| 88* | 30 | 15 | 0 | 60 | 0 | x (860) | x (0.080) | x |
| 89* | 30 | 0 | 15 | 0 | 55 | x (900) | x (0.090) | x |

① *: Comparison example
② o: No variation in surface roughness and surface accuracy, and proper optical performance.
③ x: Rough surface, deterioration in surface accuracy, and poor optical performance.

As seen from Table 2, the mold with the Ru film was free from surface roughness and deterioration in surface accuracy. The Ru-Pt binary alloy film of the Ru content of 71 wt % or more (Pt content of 29 wt % or less) showed good results. Also, the Ru-Re binary alloy and Ru-Os binary alloy films of the Ru content of 50 wt % or more (the Re or Os content of 50 wt % or less) showed good results. The Ru-Rh binary alloy film of the Ru content of 45 wt % or more (Rh content of 55 wt % or less) was free from the surface roughness and deterioration in surface accuracy, thereby enabling a glass optical element of high accuracy to be press-molded. The alloy film composed of Ru and at least two kinds of residual metals selected from the group consisting of Pt, Re, Rh and Os, in which the Ru content is 20 wt % or more, showed good results under the conditions of Pt content being 29 wt % or less, Re content being 50 wt % or less, Rh content being 55 wt % or less, or Os content being 50 wt % or less. On the other hand, the mold with an alloy film of Ru content of less than 20 wt % becomes milky at the press surface to cause roughness thereon and deterioration in the surface accuracy.

(Example 3)

This example used as the base material a cermet mainly composed of TiC or TiN or $Cr_3C_2$ or $Al_2O_3$. The base material was machined into a desired shape, and thereafter the various thin films used in Examples 1 and 2 were formed thereon, thereby forming various press molds. The thus obtained molds were subjected to the same experiment as in Example 1. Roughness and accuracy of the press surfaces were measured to decide qualities of the molds. The results of the experiment are shown in Table 3.

TABLE 3

Experimental Results of Molding Lead Oxide Series Optical Glass (Part 1)

| Composition of press surface film (wt %) | | | | | | Base Material | | | |
|---|---|---|---|---|---|---|---|---|---|
| | | | | | | Cermet Mainly of TiC | Cermet Mainly of TiN | Cermet Mainly of $Cr_3C_2$ | Cermet Mainly of $Al_2O_3$ |
| Ir | Pt | Re | Rh | Os | Ru | | | | |
| 100 | 0 | 0 | 0 | 0 | 0 | o | o | o | o |
| 0 | 0 | 0 | 0 | 0 | 100 | o | o | o | o |
| 71 | 29 | 0 | 0 | 0 | 0 | o | o | o | o |
| 50 | 0 | 50 | 0 | 0 | 0 | o | o | o | o |
| 45 | 0 | 55 | 0 | 0 | 0 | x* | x* | x* | x* |
| 45 | 0 | 0 | 55 | 0 | 0 | o | o | o | o |
| 40 | 0 | 0 | 60 | 0 | 0 | x* | x* | x* | x* |
| 50 | 0 | 0 | 0 | 50 | 0 | o | o | o | o |
| 45 | 0 | 0 | 0 | 55 | 0 | x* | x* | x* | x* |
| 50 | 0 | 0 | 0 | 0 | 50 | o | o | o | o |
| 80 | 0 | 10 | 0 | 10 | 0 | o | o | o | o |
| 80 | 0 | 10 | 10 | 0 | 0 | o | o | o | o |
| 60 | 10 | 10 | 20 | 0 | 0 | o | o | o | o |
| 60 | 0 | 20 | 0 | 10 | 10 | o | o | o | o |
| 40 | 10 | 10 | 10 | 10 | 20 | o | o | o | o |
| 40 | 10 | 20 | 10 | 10 | 10 | o | o | o | o |
| 20 | 10 | 20 | 0 | 25 | 25 | o | o | o | o |
| 20 | 0 | 10 | 25 | 0 | 25 | o | o | o | o |
| 15 | 10 | 25 | 20 | 30 | 0 | x* | x* | x* | x* |
| 30 | 10 | 55 | 0 | 5 | 0 | x* | x* | x* | x* |
| 15 | 20 | 25 | 0 | 30 | 10 | o | o | o | o |
| 10 | 0 | 30 | 20 | 25 | 15 | o | o | o | o |
| 10 | 0 | 40 | 0 | 40 | 10 | x* | x* | x* | x* |
| 0 | 29 | 0 | 0 | 0 | 71 | o | o | o | o |
| 0 | 0 | 50 | 0 | 0 | 50 | o | o | o | o |
| 0 | 0 | 55 | 0 | 0 | 45 | x* | x* | x* | x* |
| 0 | 0 | 0 | 55 | 0 | 45 | o | o | o | o |
| 0 | 0 | 0 | 60 | 0 | 40 | x* | x* | x* | x* |
| 0 | 0 | 0 | 0 | 50 | 50 | o | o | o | o |
| 0 | 0 | 0 | 0 | 55 | 45 | x* | x* | x* | x* |
| 0 | 0 | 10 | 10 | 0 | 80 | o | o | o | o |
| 0 | 0 | 10 | 0 | 10 | 80 | o | o | o | o |
| 0 | 20 | 0 | 20 | 0 | 60 | o | o | o | o |
| 0 | 0 | 20 | 0 | 20 | 60 | o | o | o | o |
| 0 | 20 | 20 | 10 | 10 | 40 | o | o | o | o |
| 0 | 20 | 40 | 0 | 0 | 40 | o | o | o | o |
| 0 | 20 | 0 | 30 | 30 | 20 | o | o | o | o |
| 0 | 0 | 30 | 30 | 20 | 20 | o | o | o | o |
| 0 | 20 | 30 | 0 | 35 | 15 | x* | x* | x* | x* |
| 0 | 0 | 35 | 20 | 30 | 15 | x* | x* | x* | x* |
| 0 | 0 | 55 | 15 | 0 | 30 | x* | x* | x* | x* |
| 0 | 15 | 0 | 60 | 0 | 30 | x* | x* | x* | x* |
| 0 | 0 | 15 | 0 | 55 | 30 | x* | x* | x* | x* |

① *: Represents each comparison example.
② o: Represents no surface roughness at the press surface, no deterioration in surface accuracy, and no peeling of the press surface film from the base material.
③ x: Represents roughness on the press surface and deterioration in the surface accuracy.

As seen from Table 3, even though the base materials are different from those of Examples 1 and 2, when the press surface film compositions are the same as those of Examples 1 and 2, the molds showed about the same results as those of Examples 1 and 2. In other words, when the base material of the mold is made either of the sintered hard alloy mainly of WC, or the cermet mainly of TiC, TiN, $Cr_3C_2$ or $Al_2O_3$, the press surface film will not be peeled from the base material. In other words, the quality of the mold is determined by the press surface film composition. Although this Example did not examine all of the compositions in Examples 1 and 2, for the above reason, the mold using as the base material the cermet mainly composed of TiC, TiN, $Cr_3C_2$ or $Al_2O_3$ may be considered to be the same as the mold using as the base material the sintered hard alloy mainly composed of WC.

(Example 4)

Figure 3:
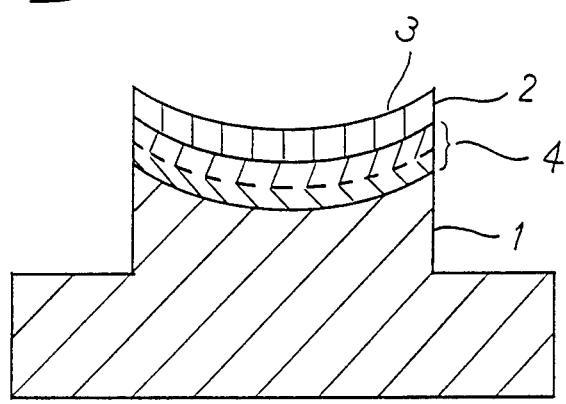

This example used Si for the base material, and, in order to strengthen the adhesive property of the press surface film to the base material, as shown in FIG. 3, on the Si base material was formed an intermediate layer 4 of one or two layers of one or two kinds of materials selected from the group consisting of SiC, Si$_3$N$_4$, SiO$_2$, TiC, TiN, BeO, ZrO$_2$, Al$_2$O$_3$, Ti, Ta, Mo and W. Thereafter, various kinds of thin films of the same compositions as those used in Examples 1 and 2 were formed on the base material including the intermediate layer, thereby constituting press molds. The molds thus formed were subjected to the same experiment as described in Example 1. The roughness and accuracy of the press surface, and peeling of the press surface film from the base material after 500 times press molding, were collectively measured to conclude the quality of each mold, thereby obtained the results shown in Table 4.

TABLE 4

Experimental Results of Molding Lead Oxide Series Glass (Part 1)

| Press surface film composition (wt %) | | | | | | Base Material construction | | | | | | | | |
|---|---|---|---|---|---|---|---|---|---|---|---|---|---|---|
| | | | | | | Si | Mo SiC Si | Ti SiC Si | Mo Si$_3$N$_4$ Si | Ti Si$_3$N$_4$ Si | Mo SiO$_2$ Si | W SiO$_2$ Si | Mo TiC Si | Ti TiC Si |
| Ir | Pt | Re | Rh | Os | Ru | | | | | | | | | |
| 100 | 0 | 0 | 0 | 0 | 0 | x | o | o | o | o | o | o | o | o |
| 0 | 0 | 0 | 0 | 0 | 100 | x | o | o | o | o | o | o | o | o |
| 71 | 29 | 0 | 0 | 0 | 0 | x | o | o | o | o | o | o | o | o |
| 50 | 0 | 50 | 0 | 0 | 0 | x | o | o | o | o | o | o | o | o |
| 45 | 0 | 55 | 0 | 0 | 0 | x | x | x | x | x | x | x | x | x |
| 50 | 0 | 0 | 0 | 50 | 0 | x | o | o | o | o | o | o | o | o |
| 45 | 0 | 0 | 0 | 55 | 0 | x | x | x | x | x | x | x | x | x |
| 0 | 29 | 0 | 0 | 0 | 71 | x | o | o | o | o | o | o | o | o |
| 0 | 0 | 50 | 0 | 0 | 50 | x | o | o | o | o | o | o | o | o |
| 0 | 0 | 55 | 0 | 0 | 45 | x | x | x | x | x | x | x | x | x |
| 0 | 0 | 0 | 0 | 50 | 50 | x | o | o | o | o | o | o | o | o |
| 0 | 0 | 0 | 0 | 55 | 45 | x | x | x | x | x | x | x | x | x |
| 50 | 0 | 0 | 0 | 0 | 50 | x | o | o | o | o | o | o | o | o |
| 80 | 0 | 10 | 10 | 0 | 0 | x | o | o | o | o | o | o | o | o |
| 60 | 0 | 20 | 0 | 10 | 10 | x | o | o | o | o | o | o | o | o |
| 60 | 10 | 10 | 20 | 0 | 0 | x | o | o | o | o | o | o | o | o |
| 40 | 10 | 10 | 10 | 10 | 20 | x | o | o | o | o | o | o | o | o |
| 20 | 10 | 20 | 0 | 25 | 25 | x | o | o | o | o | o | o | o | o |
| 15 | 10 | 25 | 20 | 30 | 0 | x | x | x | x | x | x | x | x | x |
| 30 | 10 | 55 | 0 | 5 | 0 | x | x | x | x | x | x | x | x | x |
| 10 | 0 | 30 | 20 | 25 | 15 | x | o | o | o | o | o | o | o | o |
| 0 | 0 | 10 | 10 | 0 | 80 | x | o | o | o | o | o | o | o | o |
| 0 | 20 | 0 | 20 | 0 | 60 | x | o | o | o | o | o | o | o | o |
| 0 | 20 | 40 | 0 | 0 | 40 | x | o | o | o | o | o | o | o | o |
| 0 | 20 | 0 | 30 | 30 | 20 | x | o | o | o | o | o | o | o | o |
| 0 | 20 | 30 | 0 | 35 | 15 | x | x | x | x | x | x | x | x | x |
| 0 | 0 | 55 | 15 | 0 | 30 | x | x | x | x | x | x | x | x | x |
| 0 | 0 | 15 | 0 | 55 | 30 | x | x | x | x | x | x | x | x | x |

(Part 2)

| Press surface film composition (wt %) | | | | | | Base Material construction | | | | | | | | |
|---|---|---|---|---|---|---|---|---|---|---|---|---|---|---|
| | | | | | | TiN Si | W BeO Si | Ti Al$_2$O Si | W Al$_2$O$_3$ Si | Mo ZrO$_2$ Si | Ti ZrO$_2$ Si | Au Si | Ta Si | Ti Si |
| Ir | Pt | Re | Rh | Os | Ru | | | | | | | | | |
| 100 | 0 | 0 | 0 | 0 | 0 | o | o | o | o | o | o | x | o | o |
| 0 | 0 | 0 | 0 | 0 | 100 | o | o | o | o | o | o | x | o | o |
| 71 | 29 | 0 | 0 | 0 | 0 | o | o | o | o | o | o | x | o | o |
| 50 | 0 | 50 | 0 | 0 | 0 | o | o | o | o | o | o | x | o | o |
| 45 | 0 | 55 | 0 | 0 | 0 | x | x | x | x | x | x | x | x | x |
| 50 | 0 | 0 | 0 | 50 | 0 | o | o | o | o | o | o | x | o | o |
| 45 | 0 | 0 | 0 | 55 | 0 | x | x | x | x | x | x | x | x | x |
| 0 | 29 | 0 | 0 | 0 | 71 | o | o | o | o | o | o | x | o | o |
| 0 | 0 | 50 | 0 | 0 | 50 | o | o | o | o | o | o | x | o | o |
| 0 | 0 | 55 | 0 | 0 | 45 | x | x | x | x | x | x | x | x | x |
| 0 | 0 | 0 | 0 | 50 | 50 | o | o | o | o | o | o | x | o | o |
| 0 | 0 | 0 | 0 | 55 | 45 | x | x | x | x | x | x | x | x | x |
| 50 | 0 | 0 | 0 | 0 | 50 | o | o | o | o | o | o | x | o | o |
| 80 | 0 | 10 | 10 | 0 | 0 | o | o | o | o | o | o | x | o | o |
| 60 | 0 | 20 | 0 | 10 | 10 | o | o | o | o | o | o | x | o | o |
| 60 | 10 | 10 | 20 | 0 | 0 | o | o | o | o | o | o | x | o | o |
| 40 | 10 | 10 | 10 | 10 | 20 | o | o | o | o | o | o | x | o | o |
| 20 | 10 | 20 | 0 | 25 | 25 | o | o | o | o | o | o | x | o | o |
| 15 | 10 | 25 | 20 | 30 | 0 | x | x | x | x | x | x | x | x | x |
| 30 | 10 | 55 | 0 | 5 | 0 | x | x | x | x | x | x | x | x | x |
| 10 | 0 | 30 | 20 | 25 | 15 | o | o | o | o | o | o | x | o | o |
| 0 | 0 | 10 | 10 | 0 | 80 | o | o | o | o | o | o | x | o | o |
| 0 | 20 | 0 | 20 | 0 | 60 | o | o | o | o | o | o | x | o | o |
| 0 | 20 | 40 | 0 | 0 | 40 | o | o | o | o | o | o | x | o | o |
| 0 | 20 | 0 | 30 | 30 | 20 | o | o | o | o | o | o | x | o | o |

TABLE 4-continued

Experimental Results of Molding Lead Oxide Series Glass

| 0 | 20 | 30 | 0  | 35 | 15 | x | x | x | x | x | x | x | x | x |
| 0 | 0  | 55 | 15 | 0  | 30 | x | x | x | x | x | x | x | x | x |
| 0 | 0  | 15 | 0  | 55 | 30 | x | x | x | x | x | x | x | x | x |

① o: Represents no roughness on the press surface, no deterioration in the surface accuracy, and no peeling of the press surface film from the base material.
② x: Represents each comparison example, in which the roughness on the press surface, deterioration in the surface accuracy, and peeling of the press surface film from the base material occur.

The mark x in Table 4 represents each comparison example described to be out of the scope of the present invention, which creates a milky press surface, or the press surface film is peeled from the base material, thereby being defective. The mark o shown in Table 4 represents each proper mold which is free from the occurrence of roughness at the press surface, deterioration in the press surface accuracy, or peeling of the press surface film from the base material, even after 500 times moldings, thereby enabling glass optical elements of high accuracy to be molded. Also, in the case where the Ir film, the Ru film, the Ir series alloy film, or the Ru series alloy film, is formed on the base material directly or through the intermediate layer of Au, thereby forming the mold, the film is peeled off from the base material after 2 or 3 times press-molding. On the other hand, when the adhesive strength between the base material and the press surface film is increased, the results obtained after the experiment are the same as the mold comprising the press surface film of the same composition as the abovementioned and the base member of WC or cermet. As seen from the above, in a case where the base material uses Si, the intermediate layer need only be formed so as to increase the adhesive property of the thin film to the base material. Such example other than the above example may be a thin film of W/SiC/Si, W/Si$_3$N$_4$/Si, Ti/SiO$_2$/Si, W/TiC/Si, Mo/BeO/Si, Mo/Al$_2$O$_3$/Si or W/ZrO$_2$/Si.

Although several examples have been described, they are merely exemplary of the invention and not to be constructed as limiting, the invention being defined solely by the appended claims.

What is claimed is:

1. A method for press-molding a glass optical element comprising the steps of:
   heating a mass of glass to be softened;
   pressing the softened mass of glass with a pair of heated molds; and
   cooling said pair of molds thereby to obtain a molded glass optical element,
   wherein each of said pair of molds comprises: a base material having high heat resistance, high workability and high adhesiveness to a press surface film; and said press surface film formed on said base material, said base material being a super hard alloy mainly composed of tungsten carbide (WC) or a cermet mainly composed of titanium carbide (TiC) or a cermet mainly composed of titanium nitride (TiN) or a cermet mainly composed of chromium carbide (Cr$_3$C$_2$) or a cermet mainly composed of alumina (Al$_2$O$_3$) or silicon (Si), said press surface film being: an iridium (Ir) film; or a ruthenium (Ru) film; or an alloy film comprising iridium (Ir) and one member selected from the group consisting of platinum (Pt) in an amount of 29 wt. % or less, rhenium (Re), osmium (Os), rhodium (Rh) and ruthenium (Ru); or an alloy film; comprising ruthenium (Ru) and one member selected from the group consisting of platinum (Pt) in an amount of 29 wt. % or less, rhenium (Re), osmium (Os) and rhodium (Rh).

2. A mold for press-molding a glass optical element comprising:
   a base material having high heat resistance, high workability and high adhesiveness to a press surface film, said base material being a super hard alloy mainly composed of tungsten carbide (WC) or a cermet mainly composed of titanium carbide (TiC) or a cermet mainly composed of titanium nitride (TiN) or a cermet mainly composed of chromium carbide (Cr$_3$C$_2$) or a cermet mainly composed of alumina (Al$_2$O$_3$) or silicon (Si); and
   said press surface film formed on said base material, said press surface film being: an iridium (Ir) film; or a ruthenium (Ru) film; or an alloy film comprising iridium (Ir) and one member selected from the group consisting of platinum (Pt) in an amount of 29 wt. % or less, rhenium (Re), osmium (Os), rhodium (Rh) and ruthenium (Ru); or an alloy film comprising ruthenium (Ru) and one member selected from the group consisting of platinum (Pt) in an amount of 29 wt. % or less, thenium (Re), osmium (Os) and rhodium (Rh).

3. The mold according to claim 2, wherein said press surface film is an Ir-Pt alloy film with 71 or more wt % of Ir.

4. The mold according to claim 2, wherein said press surface film is an Ir-Re alloy film with 50 or more wt % of Ir.

5. The mold according to claim 2, wherein said press surface film is an Ir-Rh alloy film with 45 or more wt % of Ir.

6. The mold according to claim 2, wherein said press surface film is an Ir-Os alloy film with 50 or more wt % of Ir.

7. The mold according to claim 2, wherein said press surface film is an Ir-Ru alloy film.

8. The mold according to claim 2, wherein said press surface film is an alloy film comprising 20 or more wt % of Ir and at least two members selected from the group consisting of Pt, Re, Rh, Os and Ru, in which contents of Pt, Re, Rh and Os are 29 or less wt %, 50 or less wt %, 55 or less wt % and 50 or less wt %, respectively.

9. The mold according to claim 2, wherein said press surface film is an alloy film comprising Ir, Ru and at least one member selected from the group consisting of Pt, Re, Rh and Os, in which content of Ir is less than 20 wt %, content of Ir and Ru being 25 or more wt %, and wherein contents of Pt, Re, Rh and Os are 29 or less wt %, 50 or less wt %, 55 or less wt % and 50 or less wt %, respectively.

10. The mold according to claim 2, wherein said press surface film is a Ru-Pt alloy film with 71 or more wt % of Ru.

11. The mold according to claim 2, wherein said press surface film is a Ru-Re alloy film with 50 or more wt % of Ru.

12. The mold according to claim 2, wherein said press surface film is a Ru-Rh alloy film with 45 or more wt % of Ru.

13. The mold according to claim 2, wherein said press surface film is a Ru-Os alloy film with 50 or more wt % of Ru.

14. The mold according to claim 2, wherein said press surface film is an alloy film comprising 20 or more wt % of Ru and at least two members selected from the group consisting of Pt, Re, Rh and Os, in which contents of Pt, Re, Rh and Os are 29 or less wt %, 50 or less wt %, 55 or less wt % and 50 or less wt %, respectively.

15. A mold according to claim 2, wherein said base material is silicon (Si) and further comprises one or two intermediate layers formed between said base material and said press surface film, each of said intermediate layers comprising at least one member selected from the group consisting of silicon carbide (SiC), silicon nitride ($Si_3N_4$), silicon dioxide ($SiO_2$), titanium carbide (TiC), titanium nitride (TiN), beryllia (BeO), zirconia ($ZrO_2$) alumina ($Al_2O_3$), titanium (Ti), tantalum (Ta), molybdenum (Mo) and tungsten (W).

* * * * *